Patented Dec. 9, 1947

2,432,474

UNITED STATES PATENT OFFICE 2,432,474

SYNTHESIS OF ORGANIC OXYGEN-CONTAINING COMPOUNDS

William F. Gresham, Wilmington, Del., assignor to E. I. du Pont de Nemours & Company, Wilmington, Del., a corporation of Delaware No Drawing. Application May 17, 1946, Serial No. 670,526

7 Claims. (Cl. 260—540)

This invention relates to the synthesis of organic oxygen-containing compounds and more particularly to the preparation of carboxylic acids by the interaction of poly-alkylene cyclic monoethers with carbon monoxide and water in the presence of specific catalysts as hereinafter set forth.

The reaction of dialkyl ethers with carbon monoxide to form carboxylic esters or acids has been known for several years. The Larson patent, U. S. 2,135,450, issued November 1, 1938, discloses that carbon monoxide reacts with aliphatic ethers in the presence of condensation catalysts such as metal and non-metal halides to form carboxylic esters; promoters such as powdered nickel, nickel oxide, etc., could be introduced to promote the activity of the condensing agent. The Gresham patent, U. S. 2,364,438, issued December 5, 1944, discloses the reaction between the cyclic diethers, especially the cyclic formals, and carbon monoxide in the presence of acidic catalysts such as boron fluoride and the like. It also has been disclosed heretofore that the reaction between dialkyl ethers and carbon monoxide in the presence of condensing agents may be directed to the formation of carboxylic acids by including water in the reaction mixture (Loder, U. S. 2,135,453). In general, however, the processes heretofore disclosed could not be employed satisfactorily with the polyalkylene cyclic monoethers, which were very difficult to hydrolyze, and which were less reactive to carbon monoxide than were the cyclic formals. Moreover, the cyclic ethers other than the formals tended to yield tarry products under the reaction conditions required for introduction of carbon monoxide. It has been observed, as disclosed in copending applications, S. N. 590,311, filed April 25, 1945, and S. N. 593,333, filed May 11, 1945, that nickel and cobalt are highly active catalysts for certain carboxylaton reactions, e. g., the introduction of carbon monoxide into vinyl ethers and esters to form acrolein, and the introduction of carbon monoxide into olefine-amine mixtures to form amides. In contrast with these prior processes the present invention is directed to the reaction of a cyclic monoether, such as tetrahydrofuran, with water and carbon monoxide in the presence of nickel carbonyl, which in certain embodiments is promoted with a metal halide. Recently it has been reported that experiments on carboxylation of tetrahydrofuran with similar catalysts also have been in progress in Germany (Chemical and Engineering News, vol. 23, No. 17, September 10, 1945).

An object of this invention is to provide an improved process for the preparation of aliphatic monocarboxylic and dicarboxylic acids. Another object of the invention is to provide a process for the synthesis of monocarboxylic acids having 5 carbon atoms per molecule. A further object is to provide a method for the synthesis of adipic acid from relatively simple and inexpensive starting materials. Other objects and advantages of the invention will appear hereinafter.

It has been discovered in accordance with this invention that polyalkylene cyclic monoethers (trimethylene oxide, tetrahydrofuran, pentamethylene oxide, etc.) react with carbon monoxide and water in the presence of nickel carbonyl, which, in general, is employed in combination with a promoter such as a nickel halide or other metal halide as set forth hereinafter, to form aliphatic carboxylic acids. In general, the reaction between the cyclic ether, carbon monoxide, and water is conducted in accordance with the invention under pressures of about 50 to 3000 atmospheres, preferably about 400 to 1200 atmospheres. The reaction temperature is generally maintained within the range of about 150° to 400° C., preferably about 250° to 350° C.

The catalyst which is employed in the practice of the invention is preferably nickel tetracarbonyl having the empirical formula Ni(CO)$_4$, but other similar carbonyls such as nickel carbonyl hydride, or hydrates thereof, may be employed if desired. The preferred combination of catalyst and promoter is a mixture of nickel carbonyl and a nickel halide such as nickel chloride or nickel iodide. In general auxiliary catalysts, or promoters, which may be employed simultaneously with nickel carbonyl include platinum, iodine, and the metal halides, such as zinc halides, copper halides, gold halides, platinum halides, and the like.

The nature of the reaction product obtained by the reaction between tetrahydrofuran, carbon monoxide and water in accordance with the invention depends to a certain extent upon the catalyst which is employed. Under certain conditions illustrated in the examples the chief product formed by the reaction is a monocarboxylic acid having 5 carbon atoms per molecule. It appears that the yield of dicarboxylic acids, such as adipic acid, is improved by the suppression of certain side reactions involving carbon monoxide and water, and that such increased yields are achieved by the avoidance of any substantial trace of catalyst for the said side reaction. Accordingly, dicarboxylic acids, such as adipic acid are formed from tetrahydrofuran, carbon monoxide, and water in the presence of nickel carbonyl in improved yields when precautions are taken to avoid corrosion of the reaction vessel, which might result in the contamination of the reaction mixture with traces of undesirable catalytic materials.

The invention is illustrated further by means of the following examples.

Example 1.—A reaction mixture containing 23.8 grams of $NiCl_2.6H_2O$, 17.1 grams of $Ni(CO)_4$, 72.1 grams of tetrahydrofuran and 70.3 grams of water was heated in a copper-lined shaker tube at a temperature of 290° to 315° C. with carbon monoxide under a pressure of 740 to 800 atmospheres. The resulting mixture was withdrawn from the reaction vessel, and the ether-soluble portion thereof was fractionated in a still equipped with an efficient fractionating column. The main product, weight 31.9 grams, was an acid fraction having a boiling point of about 75° to 97° C. at 28 to 29 mm. A relatively smaller quantity, weight 17.8 grams, of higher boiling material, B P. up to 131° C. at 1 mm. also was collected. There remained in the reaction vessel 6.4 grams of a solid acidic material. The main fraction had a neutralization equivalent of 106 (theory for n-valeric acid or methylethylacetic acid, 102.1). Redistillation of this fraction resolved it into methylethylacetic acid (B. P. 70° to 73° C. at 18 mm.; refractive index=1.4011 at 25°/D; freezing below —78 C., neutral equivalent, 102) and n-valeric acid (B. P. 77° to 80° C. at 10 mm.; refractive index=1.4093 at 25°/D; neutral equivalent, 103).

Example 2.—A mixture containing 10.0 grams of nickel carbonyl, 5 grams of $ZnCl_2$, 9.0 grams of water, 36.1 grams of tetrahydrofuran and 65 c. c. of cyclohexane was heated in a copper-lined shaker tube for 1 hour at a temperature of 310° to 330° C. under a carbon monoxide pressure of 600 to 840 atmospheres. Distillation of the reaction mixture gave 9.4 grams of a distillate having two layers, B. P. 41° to 63° C. at 100 mm. The upper layer of this fraction consisted chiefly of aliphatic monocarboxylic acids.

Example 3.—A mixture containing 72.0 grams of tetrahydrofuran, 36 grams of water, 3.5 grams of $NiCl_2.6H_2O$, 2.1 grams of $I_2$ and 5.9 grams of $Ni(CO)_4$ was heated in a shaker tube for four hours with carbon monoxide under a pressure of 200 atmospheres at a temperature of 260° to 300° C., and for an additional 0.5 hour at 500 to 700 atmospheres pressure. The product was removed from the reaction vessel, after which the said vessel was washed with water and the washings added to the reaction product. The aqueous layer was withdrawn from the resulting mixture and was extracted with benzene. The extract thus obtained was combined with the upper layer, and the mixture was distilled yielding a high boiling acid fraction (evidently containing valeric acid, methylethylacetic acid and valerolactone) which corresponded to the conversion of 25.2% based on the amount of tetrahydrofuran initially present.

Example 4.—Example 3 was repeated except that the reaction mixture also contained 1.0 gram $BiCl_3$, and 10 grams of finely divided quartz; this mixture was heated for four hours at 298° to 304° C. under a carbon monoxide pressure of 280 to 410 atmospheres. Distillation of the resulting product gave $C_5$ acids and lactones in 31% conversion, based on the amount of tetrahydrofuran initially present.

Example 5.—A mixture containing 72.1 grams of tetrahydrofuran, 36 grams of water, 3 grams of $NiCl_2.6H_2O$, 3 grams $I_2$, 5 grams of platinized asbestos (5% Pt), and 5 grams of $Ni(CO)_4$ was heated in a stainless steel shaker tube with carbon monoxide under a pressure of 265 to 320 atmospheres at a temperature of 280°. to 320° C. for 150 minutes. The resulting product was withdrawn from the reaction vessel and the vessel was thereafter washed with methanol. Distillation of the washings and reaction product gave 46 grams of product boiling in the range of methylethylacetic acid and 3.4 grams of an oily solid boiling at about 180° to 190° C. under a pressure of 5 mm. The latter was washed with ether, which caused the separation of white crystalline material, M. P., 146° to 150° C., which was identified as adipic acid by mixed melting point with an authentic sample.

It is to be understood that the above examples are illustrative only, and that numerous methods may be employed for practicing the invention. For example, the solid acidic residue, obtained after the distillation of the $C_5$ acids may be purified by fractional crystallization, whereby the adipic acid may be purified. Moreover, the acidic reaction products may be esterified by reaction with an alcohol, and the resulting esters may be separated from the mixture by careful distillation. If desired, the reaction between tetrahydrofuran, carbon monoxide and water may be carried out in a continuous manner; e. g., by passing the tetrahydrofuran and water through a tubular converter either cocurrently or countercurrently to a flow of carbon monoxide, the rates of flow being adjusted coordinately with pressure, temperature, and catalyst to yield the desired degree of reaction.

The reaction may be conducted in vessels made of or lined with silver, chromium, stainless steel, platinum, copper, and the like, or refractory materials such as glass, silica, porcelain, etc.

The monocarboxylic acids obtained in accordance with the invention are widely useful per se, and are especially valuable in the form of their esters as solvents, plasticizers, etc. The dicarboxylic acids, especially adipic acid, are of considerable value as an intermediate in the manufacture of nylon-type resins.

It is to be understood that many changes may be made in the details illustrated herein, without departing from the scope of the invention or sacrificing any of the advantages that may be derived therefrom.

I claim:

1. A process for the synthesis of carboxylic acids which comprises reacting a polyalkylene cyclic monoether with carbon monoxide in the presence of a nickel carbonyl catalyst at a temperature of about 150° to 400° C. under a pressure of 50 to 3000 atmospheres, and thereafter separating from the resulting mixture the monomeric carboxylic acids produced by the resulting reaction.

2. A process for the synthesis of carboxylic acids which comprises reacting tetrahydrofuran with carbon monoxide and water at a temperature within the range of about 150° to 400° C. under a pressure of about 50 to 300 atmospheres in the presence of a nickel carbonyl catalyst and thereafter separating from the resulting mixture the monomeric carboxylic acids produced by the resulting reaction.

3. A process for the synthesis of carboxylic acids which comprises reacting tetrahydrofuran with carbon monoxide and water at a temperature within the range of about 150° to 400° C. under a pressure of about 400 to 1200 atmospheres in the presence of a nickel carbonyl catalyst and thereafter separating from the resulting mixture the monomeric carboxylic acids produced by the resulting reaction.

4. A process for the synthesis of carboxylic acids which comprises reacting tetrahydrofuran with carbon monoxide and water at a temperature within the range of about 150° to 400° C. under a pressure of about 400 to 1200 atmospheres in the presence of a nickel carbonyl catalyst and a metal halide promoter and thereafter separating from the resulting mixture the monomeric carboxylic acids produced by the resulting reaction.

5. A process for the synthesis of carboxylic acids which comprises reacting tetrahydrofuran with carbon monoxide and water at a temperature within the range of about 150° to 400° C. under a pressure of about 400 to 1200 atmospheres in the presence of a nickel carbonyl catalyst and iodine as a promoter and thereafter separating from the resulting mixture the monomeric carboxylic acids produced by the resulting reaction.

6. A process for the synthesis of monocarboxylic acids which comprises reacting tetrahydrofuran with carbon monoxide and water at a temperature of about 250° to 350° C. under a pressure of about 400 to 1200 atmospheres in the presence of a nickel carbonyl catalyst and thereafter distilling from the resulting mixture, as the chief reaction product, a mixture of monocarboxylic acids having 5 carbon atoms per molecule.

7. A process for the synthesis of monocarboxylic acids which comprises heating about 23.8 parts by weight of $NiCl_2.6H_2O$, 17.1 parts of $Ni(CO)_3$, 72.1 parts of tetrahydrofuran, and 70.3 parts of water at a temperature of about 290° to about 315° with carbon monoxide under a pressure of about 740 to 800 atmospheres and thereafter distilling from the resulting mixture, as the chief reaction product, a monocarboxylic acid having 5 carbon atoms per molecule.

WILLIAM F. GRESHAM.

REFERENCES CITED

The following references are of record in the file of this patent:

UNITED STATES PATENTS

| Number | Name | Date |
| --- | --- | --- |
| 2,135,450 | Larson | Nov. 1, 1938 |
| 2,135,451 | Loder | Nov. 1, 1938 |
| 2,273,785 | Larson | Feb. 17, 1942 |
| 2,364,438 | Gresham | Dec. 5, 1944 |

OTHER REFERENCES

Chem. and Engineering News, vol. 23, No. 17, page 1517; Sept. 10, 1945.

Certificate of Correction

Patent No. 2,432,474. December 9, 1947.

WILLIAM F. GRESHAM

It is hereby certified that errors appear in the printed specification of the above numbered patent requiring correction as follows: Column 3, line 29, Example 1, for "—78 C.," read —78° C.,; line 39, for "9 4 grams" read *9.4 grams*; column 4, line 65, claim 2, for "300" read *3000*; and that the said Letters Patent should be read with these corrections therein that the same may conform to the record of the case in the Patent Office.

Signed and sealed this 17th day of February, A. D. 1948.

[SEAL]

THOMAS F. MURPHY,
*Assistant Commissioner of Patents.* thereafter separating from the resulting mixture the monomeric carboxylic acids produced by the resulting reaction.

4. A process for the synthesis of carboxylic acids which comprises reacting tetrahydrofuran with carbon monoxide and water at a temperature within the range of about 150° to 400° C. under a pressure of about 400 to 1200 atmospheres in the presence of a nickel carbonyl catalyst and a metal halide promoter and thereafter separating from the resulting mixture the monomeric carboxylic acids produced by the resulting reaction.

5. A process for the synthesis of carboxylic acids which comprises reacting tetrahydrofuran with carbon monoxide and water at a temperature within the range of about 150° to 400° C. under a pressure of about 400 to 1200 atmospheres in the presence of a nickel carbonyl catalyst and iodine as a promoter and thereafter separating from the resulting mixture the monomeric carboxylic acids produced by the resulting reaction.

6. A process for the synthesis of monocarboxylic acids which comprises reacting tetrahydrofuran with carbon monoxide and water at a temperature of about 250° to 350° C. under a pressure of about 400 to 1200 atmospheres in the presence of a nickel carbonyl catalyst and thereafter distilling from the resulting mixture, as the chief reaction product, a mixture of monocarboxylic acids having 5 carbon atoms per molecule.

7. A process for the synthesis of monocarboxylic acids which comprises heating about 23.8 parts by weight of $NiCl_2.6H_2O$, 17.1 parts of $Ni(CO)_3$, 72.1 parts of tetrahydrofuran, and 70.3 parts of water at a temperature of about 290° to about 315° with carbon monoxide under a pressure of about 740 to 800 atmospheres and thereafter distilling from the resulting mixture, as the chief reaction product, a monocarboxylic acid having 5 carbon atoms per molecule.

WILLIAM F. GRESHAM.

REFERENCES CITED

The following references are of record in the file of this patent:

UNITED STATES PATENTS

| Number | Name | Date |
| --- | --- | --- |
| 2,135,450 | Larson | Nov. 1, 1938 |
| 2,135,451 | Loder | Nov. 1, 1938 |
| 2,273,785 | Larson | Feb. 17, 1942 |
| 2,364,438 | Gresham | Dec. 5, 1944 |

OTHER REFERENCES

Chem. and Engineering News, vol. 23, No. 17, page 1517; Sept. 10, 1945.

---

Certificate of Correction

Patent No. 2,432,474. December 9, 1947.

WILLIAM F. GRESHAM

It is hereby certified that errors appear in the printed specification of the above numbered patent requiring correction as follows: Column 3, line 29, Example 1, for "—78 C.," read *—78° C.*,; line 39, for "9 4 grams" read *9.4 grams*; column 4, line 65, claim 2, for "300" read *3000*; and that the said Letters Patent should be read with these corrections therein that the same may conform to the record of the case in the Patent Office.

Signed and sealed this 17th day of February, A. D. 1948.

[SEAL]

THOMAS F. MURPHY,
*Assistant Commissioner of Patents.*